US012706316B2

(12) United States Patent
Aslani et al.

(10) Patent No.: US 12,706,316 B2
(45) Date of Patent: Aug. 11, 2026

(54) AIR SUPPLY PLENUM FOR VEHICLE HEAT EXCHANGER

(71) Applicant: Hyroad Networks LLC, Austin, TX (US)

(72) Inventors: Mohamad Aslani, Phoenix, AZ (US); Yatish Chandra, San Francisco, CA (US); Aiden Cohan, Phoenix, AZ (US); Seth Derouen, Phoenix, AZ (US); Akshit Markan, Tempe, AZ (US); Derek McVay, Phoenix, AZ (US); Mozhgan Rahimi, Scottsdale, AZ (US); Ben Watson, Tempe, AZ (US)

(73) Assignee: HYROAD NETWORKS LLC, Austin, TX (US)

( * ) Notice: Subject to any disclaimer, the term of this patent is extended or adjusted under 35 U.S.C. 154(b) by 454 days.

(21) Appl. No.: 18/467,987

(22) Filed: Sep. 15, 2023

(65) Prior Publication Data

US 2024/0097156 A1 Mar. 21, 2024

Related U.S. Application Data

(60) Provisional application No. 63/376,078, filed on Sep. 17, 2022.

(51) Int. Cl.
*H01M 8/04007* (2016.01)
*B60K 1/00* (2006.01)
(Continued)

(52) U.S. Cl.
CPC ........... *H01M 8/04074* (2013.01); *B60K 1/04* (2013.01); *B60K 11/04* (2013.01); *B60L 58/30* (2019.02);
(Continued)

(58) Field of Classification Search
CPC ............... B60K 1/04; B60K 2001/005; H01M 8/04074; H01M 2250/20;
(Continued)

(56) References Cited

U.S. PATENT DOCUMENTS

| | | | |
|---|---|---|---|
| 3,827,523 | A | 8/1974 | Williams |
| 4,362,208 | A | 12/1982 | Hauser |

(Continued)

FOREIGN PATENT DOCUMENTS

| | | | |
|---|---|---|---|
| WO | 2020013746 | A1 | 1/2020 |
| WO | 2021171213 | A1 | 2/2021 |

OTHER PUBLICATIONS

USPTO; International Search Report and Written Opinion dated Apr. 2, 2024 in US Application No. PCT/US23/174354.

*Primary Examiner* — Tinh T Dang
(74) *Attorney, Agent, or Firm* — SNELL & WILMER L.L.P.

(57) ABSTRACT

An electric vehicle includes a first heat exchanger positioned adjacent to a front of the electric vehicle and configured to transfer heat generated from a first heat generating system to an ambient environment. The electric vehicle may further include a second heat exchanger positioned adjacent to a rear of the electric vehicle and configured to transfer heat generated from a second heat generating system to the ambient environment, and an air supply plenum positioned longitudinally between the first heat exchanger and the second heat exchanger and in fluid communication with the ambient environment. The air supply plenum may define a cooling air pathway extending between the ambient environment and the second heat exchanger. The air supply plenum may isolate air flowing through the cooling air pathway from air circulating within the electric vehicle.

20 Claims, 10 Drawing Sheets

(51) Int. Cl.

| | |
|---|---|
| ***B60K 1/04*** | (2019.01) |
| ***B60K 11/04*** | (2006.01) |
| ***B60L 58/30*** | (2019.01) |
| *B60L 7/10* | (2006.01) |
| *B60L 58/32* | (2019.01) |
| *B60L 58/40* | (2019.01) |

(52) U.S. Cl.
CPC ........... *B60K 2001/005* (2013.01); *B60L 7/10* (2013.01); *B60L 58/32* (2019.02); *B60L 58/40* (2019.02); *H01M 2250/20* (2013.01)

(58) Field of Classification Search
CPC ............ H01M 8/04–04216; B60L 7/10; B60L 58/10–40
See application file for complete search history.

(56) References Cited

U.S. PATENT DOCUMENTS

| | | | |
|---|---|---|---|
| 2009/0065171 | A1 | 3/2009 | McPherson et al. |
| 2020/0079224 | A1* | 3/2020 | Pien .................. H01M 10/6568 |
| 2020/0079225 | A1* | 3/2020 | Samyn .................... B60L 53/14 |
| 2021/0129659 | A1 | 5/2021 | Andersson et al. |
| 2021/0135255 | A1 | 5/2021 | Sawada et al. |
| 2021/0155224 | A1 | 5/2021 | McKibben et al. |
| 2023/0226903 | A1 | 7/2023 | Van Der Knaap et al. |

* cited by examiner

AIR SUPPLY PLENUM FOR VEHICLE HEAT EXCHANGER

CROSS-REFERENCE TO RELATED APPLICATIONS

This application claims priority to and the benefit of U.S. Provisional Patent Application Ser. No. 63/376,078 entitled "AIR SUPPLY PLENUM FOR VEHICLE HEAT EXCHANGER" filed on Sep. 17, 2022. The foregoing application is hereby incorporated by reference in its entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to electric vehicles, and more particularly, to electric commercial vehicles having a heat exchanger and air supply plenum.

BACKGROUND

Commercial electric vehicles, for example, heavy-duty fuel cell electric vehicles (FCEVs) and battery electric vehicles (BEVs), include a number of vehicle systems that require thermal management in order to operate efficiently and effectively. In particular, these vehicles may include a fuel cell and/or battery system that provides the power necessary to propel the vehicle, a propulsion system such as an electric axle (or e-axle) that converts electrical energy from the fuel cell and/or battery system to mechanical energy to drive the vehicle's wheels, a regenerative and/or foundation braking system that slows the vehicle, one or more high-voltage components that facilitate power transfer from the fuel cell and/or battery system to the e-axle, and a vehicle cabin that contains and provides comfort for the operator of the vehicle. Packaging the above-stated systems and their associated thermal management systems may present a challenge to manufacturers due to federal size regulations that limit the size and weight of the vehicle. As a result, vehicle designs that are able to physically accommodate the above-stated systems, while still achieving adequate system performance, remain desirable.

SUMMARY

An electric vehicle may comprise a first heat exchanger positioned adjacent to a front of the electric vehicle and configured to transfer heat generated from a first heat generating system to an ambient environment, a second heat exchanger positioned adjacent to a rear of the electric vehicle and configured to transfer heat generated from a second heat generating system to the ambient environment, and an air supply plenum positioned longitudinally between the first heat exchanger and the second heat exchanger and in fluid communication with the ambient environment. The air supply plenum may define a cooling air pathway extending between the ambient environment and the second heat exchanger and the air supply plenum may isolate air flowing through the cooling air pathway from air circulating within the electric vehicle.

In various embodiments, the first heat generating system may comprise a fuel cell system. The second heat generating system may comprise a brake resistor. The air supply plenum may comprise a first side intake in fluid communication with the ambient environment through a first side of the electric vehicle and a second side intake in fluid communication with the ambient environment through a second side of the electric vehicle. The air supply plenum may be positioned in a backpack storage compartment of the electric vehicle. The air supply plenum may be positioned vertically above at least one horizontally oriented fuel storage vessel. The first side intake may comprise an inlet comprising a substantially transversely oriented opening and a substantially longitudinally oriented opening. The inlet may be positioned adjacent to a channel positioned between a rear cabin fairing assembly and a backpack fairing assembly.

An electric vehicle may comprise a vehicle body comprising a first side, a second side, a front, and a rear, a first heat exchanger positioned adjacent to the front of the vehicle body, a second heat exchanger positioned adjacent to the rear of the vehicle body, and an air supply plenum in fluid communication with an ambient environment located on at least one of the first side or the second side. The air supply plenum may be further in fluid communication with the second heat exchanger and may be configured to isolate air flowing from the ambient environment to the second heat exchanger from air circulating within the vehicle body.

In various embodiments, the first heat exchanger may comprise a fuel cell radiator and the second heat exchanger may comprise a brake resistor radiator. A rear cabin fairing assembly may extend rearward from a cabin of the electric vehicle. The electric vehicle may further comprise a backpack fairing assembly positioned adjacent to and rearward of the rear cabin fairing assembly. The electric vehicle may further comprise a channel positioned between the rear cabin fairing assembly and the backpack fairing assembly. The electric vehicle may further comprise a labyrinth seal positioned between the rear cabin fairing assembly and the backpack fairing assembly. The air supply plenum may comprise at least one inlet in fluid communication with the channel. The air supply plenum may comprise an outboard portion and inboard portion. A height of the outboard portion may continuously decrease as the outboard portion approaches the inboard portion.

An electric vehicle may comprise a heat exchanger positioned adjacent to a rear of the electric vehicle and in fluid communication with an ambient environment and an air supply plenum positioned forward of the heat exchanger and in fluid communication with the heat exchanger. The air supply plenum may comprise a first side intake in fluid communication the ambient environment located on a first side of the electric vehicle. The air supply plenum may comprise a second side intake in fluid communication with the ambient environment located a second side of the electric vehicle. The air supply plenum may comprise a central duct in fluid communication with the first side intake, the second side intake, and the heat exchanger.

In various embodiments, the central duct may be coupled to the heat exchanger. The air supply plenum may isolate air flowing from the ambient environment to the heat exchanger from air circulating within the electric vehicle.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1A:
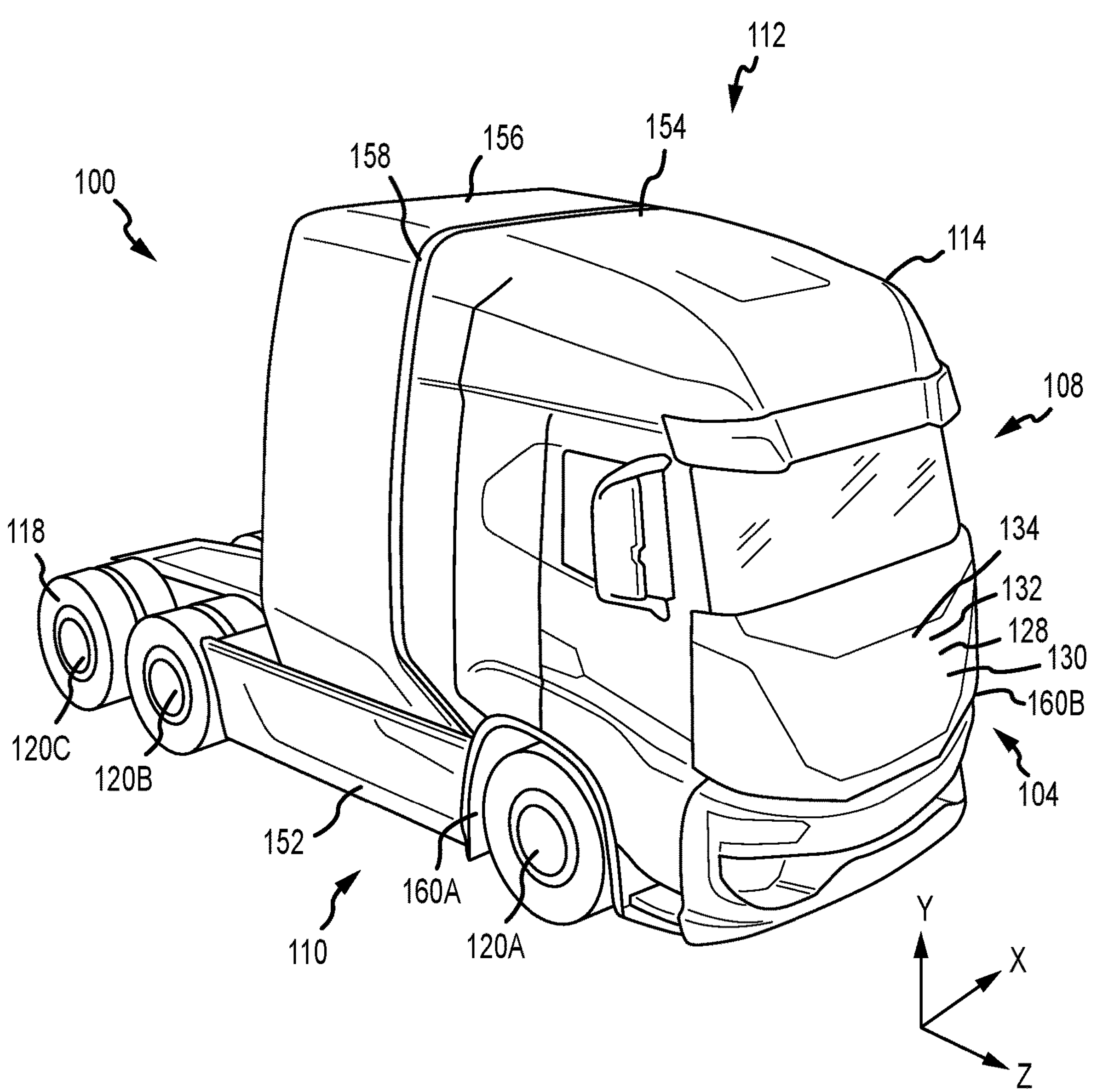
FIGS. 1A and 1B illustrate a front perspective view and a rear perspective view, respectively, of an electric commercial vehicle, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and/or mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

In the context of the present disclosure, methods, systems, and articles may find particular use in connection with heavy-duty electric commercial vehicles. However, various aspects of the disclosed embodiments may be adapted for performance in a variety of other systems, including internal combustion heavy-duty commercial vehicles, internal combustion or electric medium-duty vehicles, passenger vehicles, off-road vehicles, watercraft, or any other mobile or stationary system requiring thermal management. As such, numerous applications of the present disclosure may be realized.

Medium- and heavy-duty commercial vehicles are large contributors to greenhouse gas emissions both domestically and internationally. For example, while forming only about five percent of vehicles on roads in the United States in 2020, the United States Environmental Protection Agency estimates that such vehicles accounted for approximately 25% of total emissions in the transportation sector. As a result, there has been a recent push to reduce greenhouse gas emissions from medium- and heavy-duty commercial vehicles, in part, through the electrification of these vehicles. As a result, traditional problems related to the packaging of internal combustion engines and related components have been replaced with problems related to the packaging and protection of electrical powertrain systems and components (such as high voltage battery systems or fuel cells), thermal management systems and components, and electronics, among others.

While packaging constraints exist for both internal combustion engine commercial vehicles and electric commercial vehicles, these constraints are more problematic for electric commercial vehicles because these vehicles typically have more total parts and more systems requiring thermal management. For example, modern electric commercial vehicles may include more than seven thousand parts and include thermal management systems for battery and/or fuel cell systems, e-axles, high voltage electronics, brake resistors, and the vehicle cabin. In the case of FCEVs, radiator assemblies associated with fuel cell modules may be larger than radiator assemblies associated with diesel engines because the amount of heat rejection required for the fuel cell modules can be greater than that required for diesel engines. Moreover, certain methods of heat dissipation available for internal combustion vehicles (for example, partial heat dissipation through convective heat transfer from air flowing into the engine cavity and partial heat dissipation through engine exhaust) may not be available or as effective for FCEVs.

Due to the increased cooling demands and size requirements, fuel cell radiator assemblies for commercial FCEVs may be placed near the front of the vehicle in order to maximize airflow into the radiator and satisfy packaging requirements. While positioning fuel cell radiator assemblies in this manner may be beneficial for thermal management of the fuel cell system, doing so may necessitate relocation of thermal management systems of other vehicle systems to areas of the vehicle that do not typically receive sufficient airflow from the ambient environment to meet cooling demands. As a result, new vehicle designs that can accommodate multiple thermal management systems while ensuring sufficient cooling airflow to each thermal management system remains desirable.

Figure 1B:
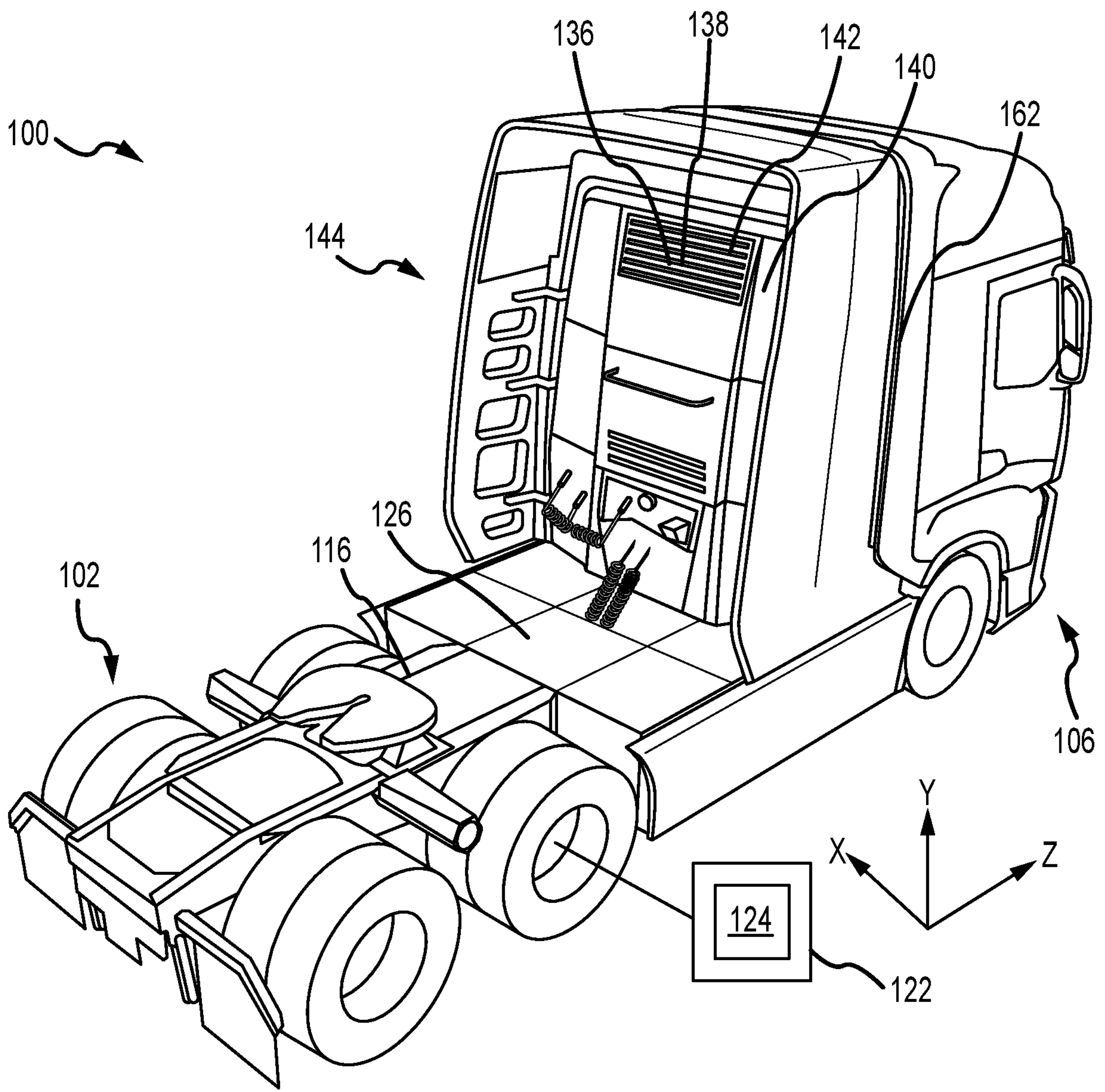

Accordingly, with reference to FIGS. 1A and 1B, a vehicle 100 is illustrated from a front perspective view and a rear perspective view, respectively, in accordance with various embodiments. Vehicle 100 may comprise an electric commercial vehicle with an electric drivetrain in various embodiments. As illustrated, vehicle 100 is a heavy-duty FCEV. Vehicle 100 is a tractor unit that may tow a trailer unit configured to hold and transport cargo. Vehicle 100 may comprise a class 8, class 7, class 6, or any other weight classification of tractor-trailer combination. As described herein, vehicle 100 extends in a longitudinal direction along the Z-axis from a rear 102 of vehicle 100 to a front 104 of vehicle 100. Vehicle 100 extends in a transverse direction along the X-axis from a first side 106 (passenger side) of vehicle 100 to a second side 108 (driver side) of vehicle 100. Finally, vehicle 100 extends in a vertical direction along the Y-axis from a bottom 110 of vehicle 100 to a top 112 of vehicle 100.

Vehicle 100 comprises a cabin 114 supported by a chassis 116. Cabin 114 may be configured to shelter one or more vehicle operators or passengers from the ambient environment. In various embodiments, cabin 114 comprises a door configured to allow ingress and egress into and from cabin 114, one or more seats, a windshield, and numerous accessories configured to improve comfort for the operator and/or passenger(s). As illustrated throughout, vehicle 100 comprises a cab-over or cab-forward style tractor unit, but is not limited in this regard and may comprise any style of tractor unit including a conventional or American cab style tractor unit.

Vehicle 100 further comprises wheels 118 comprising one or more tires coupled to one or more axles 120 and configured to roll along a driving surface. In various embodiments, vehicle 100 comprises a pair of single wheels coupled to a front axle 120A and a pair of dual wheels coupled to two rear axles (first rear axle 120B and second rear axle 120C). One or more of the axles may be driven. For example, in various embodiments, vehicle 100 may comprise a 6×2 configuration with a single driven axle (for example, first rear axle 120B); however, vehicle 100 is not limited in this regard and may comprise a 4×2, 6×4, 6×6, or other suitable configuration. In various embodiments, the one or more driven axles may be driven using one or more electric motors.

Vehicle 100 further comprises a braking system 122 having a brake assembly coupled to one or more of the wheel ends of vehicle 100. In various embodiments, braking system 122 comprises a regenerative braking system comprising at least one brake resistor 124, a friction braking system, or a combination thereof. As vehicle 100 decelerates, the electric motor(s) in the one or more driven axles may act as generators and convert kinetic energy to electrical energy to charge a battery system 126. When battery system 126 is fully charged or unable to accept the amount of power generated by the regenerative braking system, some of the electrical energy may be dissipated as heat in brake resistor 124. Dissipating excess electrical energy as heat may help prevent damage to certain system components (such as the electric motor) in response to large power spikes. However, without thermal management, brake resistor 124 can overheat, and vehicle 100 must instead rely on the use of the friction braking system in order to decelerate.

In various embodiments, battery system 126 comprises a rechargeable, or secondary, battery system configured to store energy from an external power source (for example, a charging station), from a fuel cell system, from a solar panel on vehicle 100, and/or from regenerative braking or other applications. Battery system 126 may release this stored energy in the form of electricity to power one or more electric motors and/or to supply power to other vehicle components utilizing electricity to operate. In various embodiments, battery system 126 may comprise lithium-ion batteries; however, battery system 126 is not limited in this regard and may comprise other rechargeable battery types such as a lead-acid battery, nickel-cadmium battery, nickel-metal hydride battery, lithium iron sulfate battery, lithium iron phosphate battery, lithium sulfur battery, solid state battery, flow battery, or any other type of suitable battery.

In various embodiments, vehicle 100 further comprises a fuel cell system 128 comprising one or more fuel cells capable of facilitating an electrochemical reaction to produce an electric current. For example, the one or more fuel cells may be proton-exchange membrane (PEM) fuel cells which may receive a fuel (such as diatomic hydrogen gas) configured to react with an oxidizing agent (such as oxygen) to generate electricity with heat and water as byproducts. In various embodiments, fuel cell system 128 comprises fuel cells other than PEM fuel cells, for example, alkaline fuel cells, phosphoric acid fuel cells, molten carbonate fuel cells, solid oxide fuel cells, or any other suitable fuel cell type.

Vehicle 100 may further be equipped with one or more thermal management systems configured to provide heat to or remove heat from one or more vehicle systems. In various embodiments, vehicle 100 comprises a first thermal management system 130 comprising a first heat exchanger 132 positioned adjacent to the front 104 of vehicle 100, for example, immediately rearward of a grille 134. First thermal management system 130 (and first heat exchanger 132) may be in fluid communication with the ambient environment via one or more apertures formed in grille 134.

Vehicle 100 further comprises a second thermal management system 136 comprising a second heat exchanger 138 positioned adjacent to a rear of cabin 114, for example, immediately forward of a rear panel assembly 140 of vehicle 100. Second thermal management system 136 (and second heat exchanger 138) are in fluid communication with the ambient environment via one or more apertures formed in a rear vent 142 coupled to rear panel assembly 140. While described herein as comprising a first thermal management system 130 and a second thermal management system 136, vehicle 100 is not limited in this regard and may comprise more thermal management systems operating jointly or independently from first thermal management system 130 and/or second thermal management system 136 in various embodiments.

In various embodiments, first thermal management system 130 (and first heat exchanger 132) may be configured to thermally regulate fuel cell system 128. More specifically, as fuel cell system 128 facilitates the electrochemical reaction between the fuel and the oxidizing agent, large amounts of heat may be generated due to the exothermic nature of such reactions. As fuel cell system 128 desirably operates within certain operating temperatures to operate efficiently, this heat should be transferred to other vehicle systems (for example, cabin 114 for heating purposes or to battery system 126 for preconditioning) or otherwise dissipated to the ambient environment via first heat exchanger 132. As such, first heat exchanger 132 comprises a radiator assembly in various embodiments; however, first heat exchanger 132 is not limited in this regard and may comprise another heat exchanger such as a condenser or evaporator in various embodiments. Moreover, while discussed as thermally regulating fuel cell system 128, it should be appreciated that first thermal management system 130 (and first heat exchanger 132) may be configured to thermally regulate any other vehicle system requiring thermal management in various embodiments, including battery system 126, brake resistor 124, cabin 114, axles 120, and/or high voltage electronics.

In various embodiments, second thermal management system 136 (and second heat exchanger 138) may be configured to thermally regulate brake resistor 124. As discussed above, brake resistor 124 may overheat without thermal management, so second thermal management system 136 (and second heat exchanger 138) may be configured to dissipate heat from brake resistor 124 by transferring heat to the ambient environment. Similar to first heat exchanger 132, second heat exchanger 138 comprises a radiator assembly; however, second heat exchanger 138 is not limited in this regard and may comprise another heat exchanger such as a condenser or evaporator in various embodiments. Moreover, while discussed as thermally regulating brake resistor 124, it should be appreciated that second thermal management system 136 (and second heat exchanger 138) may be configured to thermally regulate any other vehicle system requiring thermal management in various embodiments, including battery system 126, fuel cell system 128, cabin 114, axles 120, and/or high voltage electronics.

Figure 3A:
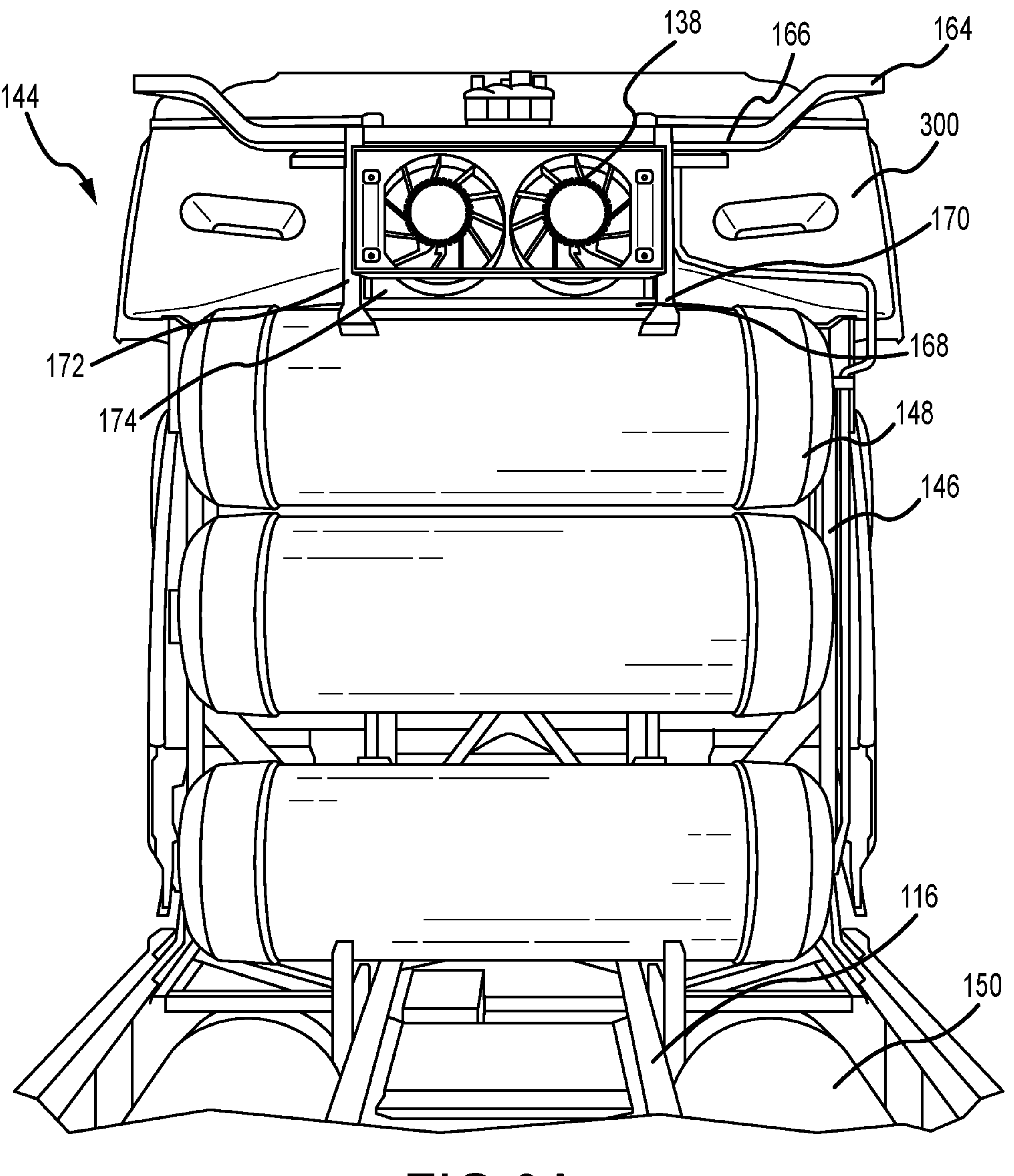
FIGS. 3A-3C illustrate various views of a partially assembled electric commercial vehicle, in accordance with various embodiments.
Figure 3B:
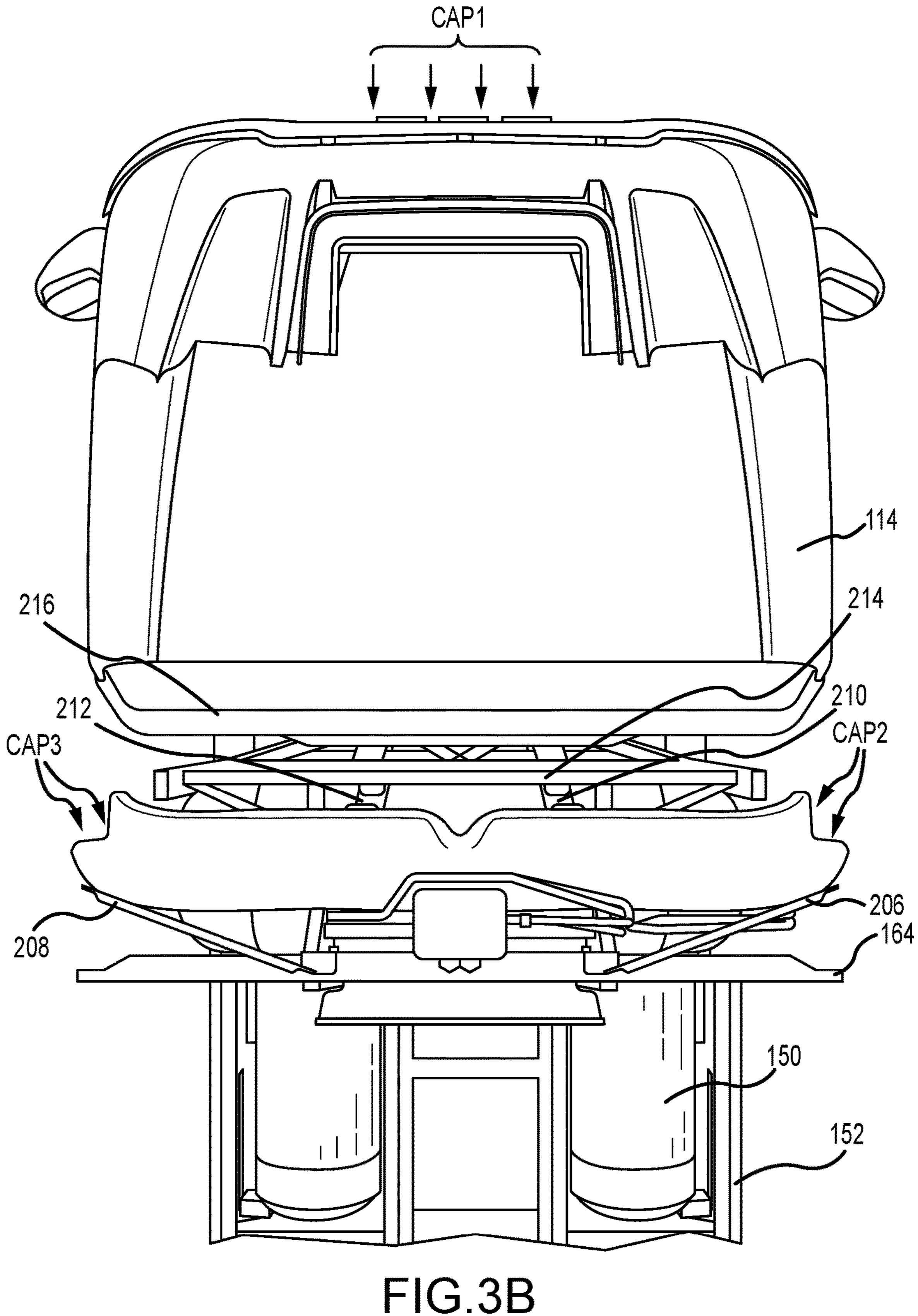
Figure 3C:
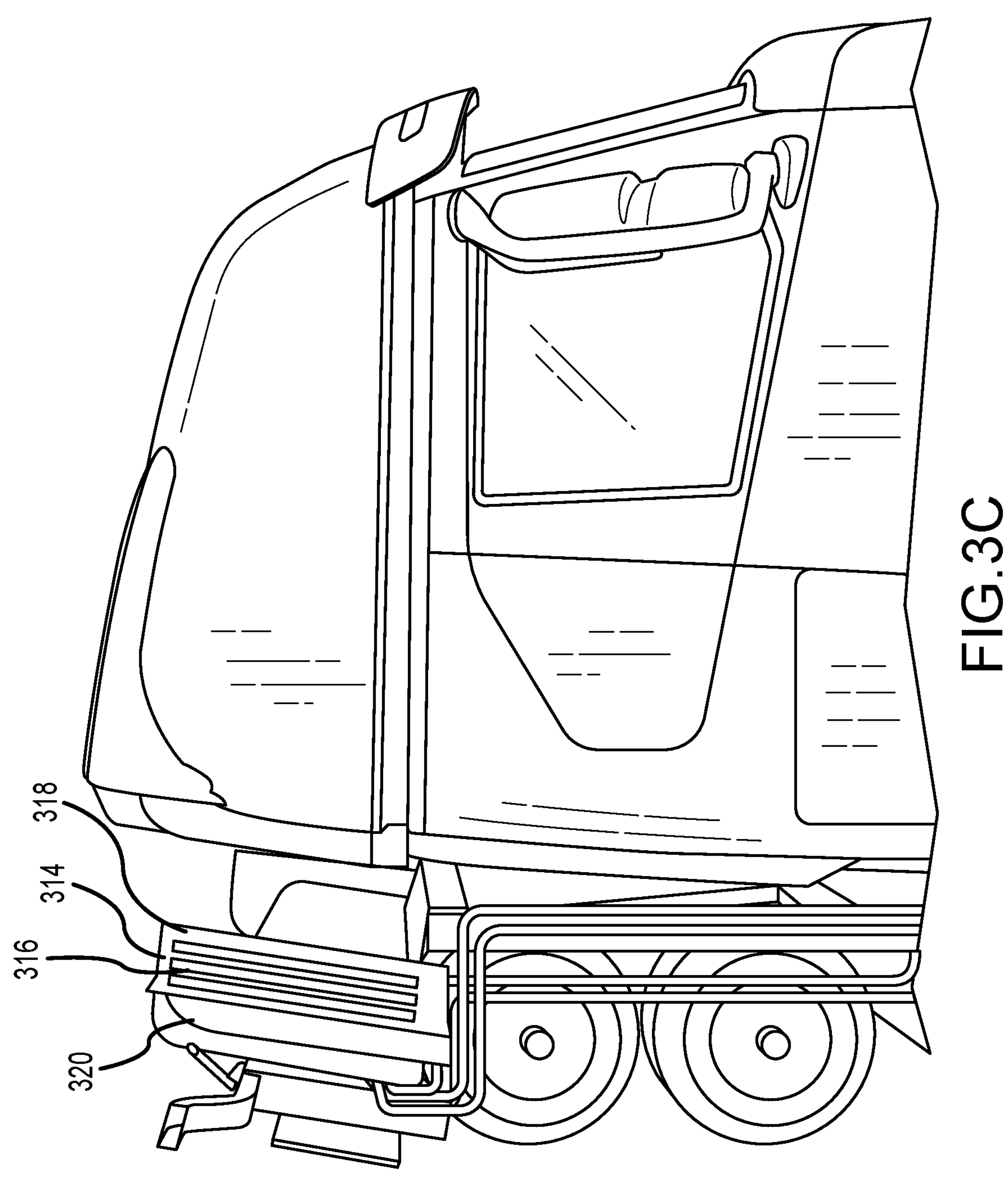

With momentary reference to FIGS. 3A-3C, vehicle 100 further comprises a backpack storage compartment 144 positioned rearward of cabin 114. Backpack storage compartment 144 contains a vessel frame assembly 146 which may be configured to contain, protect, and limit movement of at least one horizontally oriented fuel storage vessel 148. The at least one horizontally oriented fuel storage vessel 148 may be in addition to one or more sidesaddle fuel storage vessels 150, which may be positioned outboard of the frame rails of chassis 116. The horizontally oriented fuel storage vessel(s) 148 and sidesaddle fuel storage vessel(s) 150 may be configured to receive, contain, and deliver fuel to fuel cell system 128. As such, in various embodiments, backpack storage compartment 144 further contains one or more fuel lines, valves, vent lines, and other components utilized to deliver fuel to or from the at least one fuel storage vessels 148, 150.

In various embodiments, vehicle 100 further comprises one or more exterior panels configured to improve aerodynamic performance of vehicle 100. More specifically, in various embodiments, vehicle 100 comprises one or more side fenders 152 substantially parallel with the side members of chassis 116, positioned on either side of vehicle 100, and extending longitudinally between front axle 120A and first rear axle 120B. Vehicle 100 further comprises a rear cabin fairing assembly 154. Rear cabin fairing assembly 154 is coupled to and extends longitudinally rearward from cabin 114 on the driver side, passenger side, and top of vehicle 100. In various embodiments, rear cabin fairing assembly 154 is substantially continuous with cabin 114 such that the external geometry of rear cabin fairing assembly 154 substantially aligns with the external geometry of cabin 114. In various embodiments, rear cabin fairing assembly 154 comprises multiple panels formed separately and coupled together, however, rear cabin fairing assembly 154 is not limited in this regard and may comprise a single, monolithic component.

Vehicle 100 further comprises a backpack fairing assembly 156 that partially covers backpack storage compartment 144 in various embodiments. Backpack fairing assembly 156 is coupled to chassis 116 and rear cabin fairing assembly 154 and extends longitudinally rearward from rear cabin fairing assembly 154 on first side 106, second side 108, and top 112 of vehicle 100. Backpack fairing assembly 156 may be substantially continuous with rear cabin fairing assembly 154 and may substantially align with the external geometry of rear cabin fairing assembly 154. Stated otherwise, the external geometry of vehicle 100 may be substantially continuous from cabin 114 to backpack fairing assembly 156. Together, the external geometry of cabin 114, rear cabin fairing assembly 154, and backpack fairing assembly 156 reduce drag as vehicle 100 operates by minimizing potential separation of airflow and pressure wakes downstream.

Figure 2A:
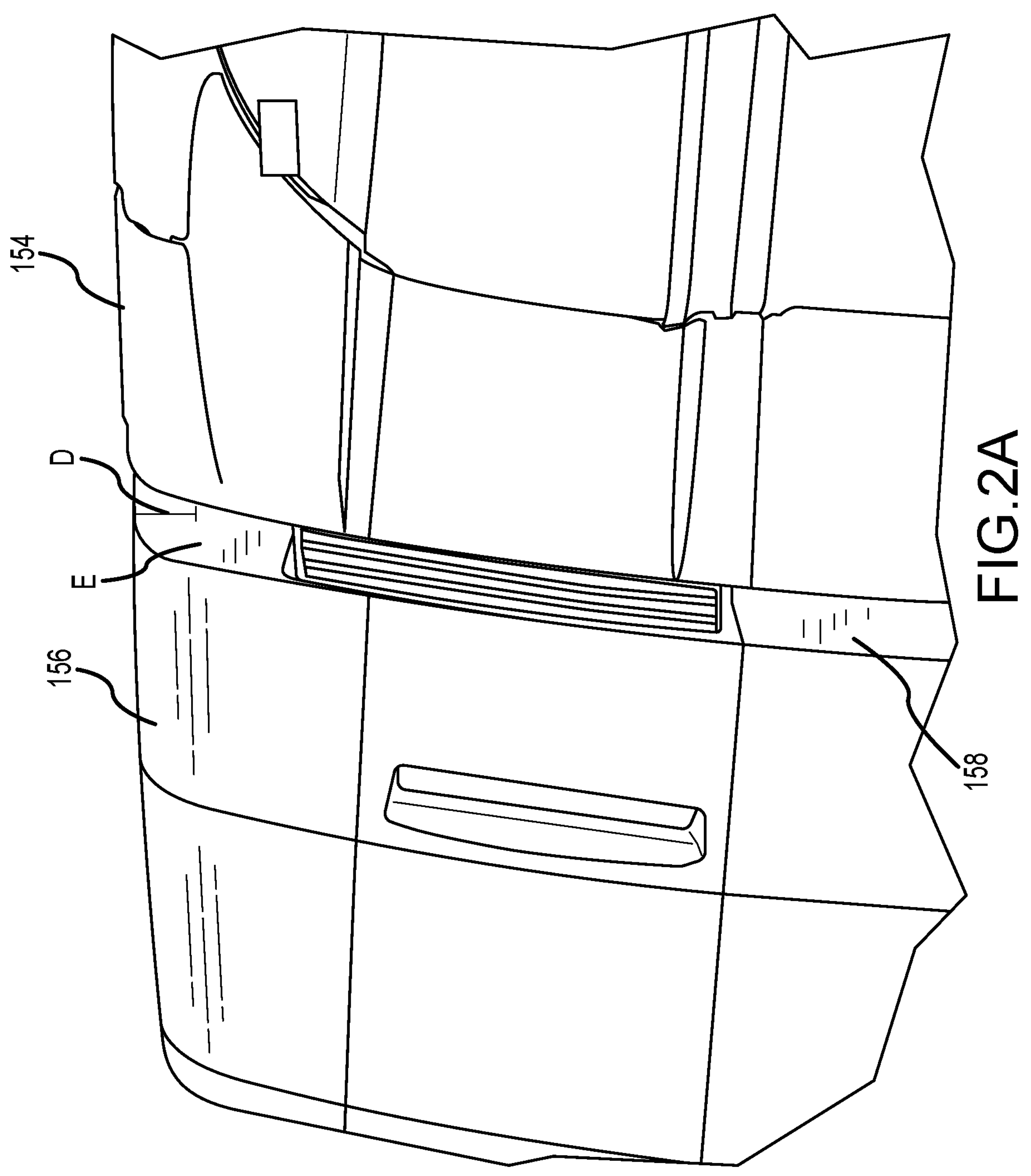
FIGS. 2A and 2B illustrate a close-up front perspective view and a close-up rear perspective view, respectively, of an electric commercial vehicle, in accordance with various embodiments.
Figure 2B:
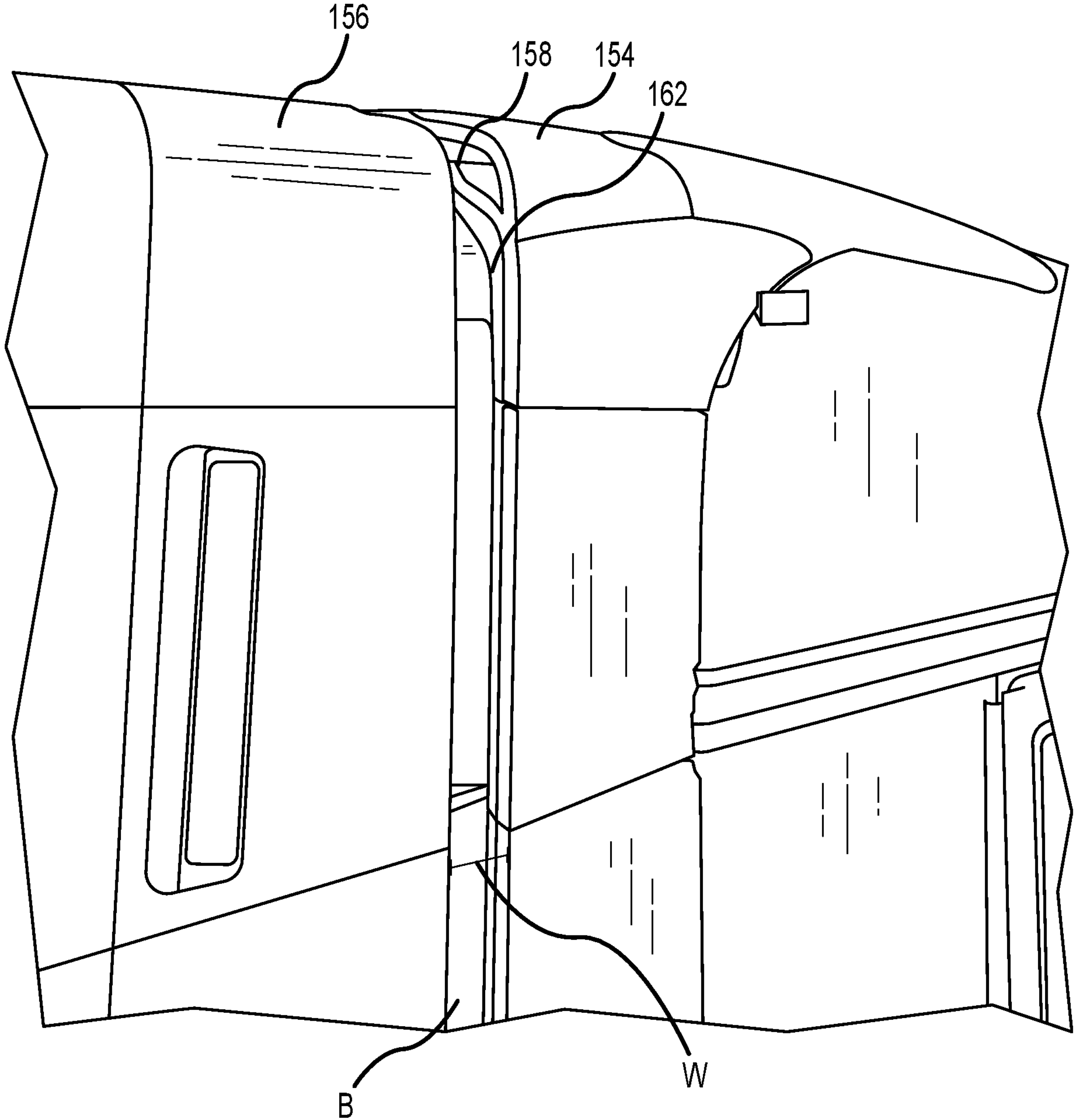

With additional reference to FIGS. 2A and 2B, vehicle 100 further comprises a channel 158 situated between rear cabin fairing assembly 154 and backpack fairing assembly 156. In various embodiments, channel 158 comprises an elongated feature devoid of material between rear cabin fairing assembly 154 and backpack fairing assembly 156. Channel 158 may be defined by a step formed in backpack fairing assembly 156. Channel 158 may originate at a first wheel well 160A (for example, a front wheel well on the passenger side or driver side of vehicle 100), extend entirely around vehicle 100 between rear cabin fairing assembly 154 and backpack fairing assembly 156, and terminate at a second wheel well 160B (for example, the front wheel well on the passenger side of driver side of vehicle 100). Stated otherwise, channel 158 may originate at first wheel well 160A, travel along first side 106 of vehicle 100, travel along the top 112 of vehicle 100, travel along second side 108 of vehicle 100 (passenger side or driver side of vehicle 100), and terminate at second wheel well 160B.

In various embodiments, channel 158 is configured with a depth D measured from an exterior surface of backpack fairing assembly 156 to a base B of channel 158 and a width W measured from a rear edge of rear cabin fairing assembly 154 to a front edge of backpack fairing assembly 156. In various embodiments, the depth D of channel 158 may be between approximately 0.08 meters and 0.16 meters, between approximately 0.10 meters and 0.14 meters, or approximately 0.12 meters. The width W of channel 158 may be between approximately 0.06 meters and 0.14 meters, between approximately 0.08 meters and 0.12 meters, or approximately 0.10 meters. The above-stated dimensions of channel 158 may be configured to permit sufficient airflow into channel 158 (for reasons that will be discussed in detail below) without substantially impacting the aerodynamic performance of vehicle 100. More specifically, in various embodiments, the presence of channel 158 (and the inlets of air supply plenum discussed below) may increase the drag coefficient of vehicle 100 by no more than 0.03, no more than 0.025, or no more than 0.02.

In various embodiments, vehicle 100 further comprises a labyrinth seal 162 situated in channel 158. Labyrinth seal 162 may comprise an elastomeric material and may be configured to form an airtight or substantially airtight seal between rear cabin fairing assembly 154 and backpack fairing assembly 156. In various embodiments, labyrinth seal 162 extends along an entire length of channel 158 and is positioned immediately inward of a rearmost portion of rear cabin fairing assembly 154 and positioned immediately outward of a forwardmost portion of backpack fairing assembly 156. Labyrinth seal 162 may comprise a single, monolithic component or may comprise multiple seals positioned adjacent to one another. As will be discussed in further detail below, labyrinth seal 162 may be configured to prevent relatively warm air that may be present forward of labyrinth seal 162 from entering backpack storage compartment 144 and/or second heat exchanger 138.

In various embodiments, second heat exchanger 138 is coupled to and supported by at least a portion of vessel frame assembly 146. More specifically, in various embodiments, vessel frame assembly 146 comprises an upper frame assembly 164 comprising an upper member 166, a lower member 168, a first side member 170, and a second side member 172. While illustrated as floating in space, it should be appreciated that upper frame assembly 164 may be mechanically coupled to the remaining portions of vessel frame assembly 146 (hidden for ease of illustration). Upper member 166 is positioned vertically above and spaced apart from lower member 168 in the vertical direction. At least a portion of upper member 166 may be substantially parallel with lower member 168. In various embodiments, first side member 170 is spaced apart from second side member 172 in the transverse direction and is substantially parallel to second side member 172. In various embodiments, upper member 166 and lower member 168 are oriented substantially orthogonal to first side member 170 and second side member 172. As a result, upper member 166, lower member 168, first side member 170, and second side member 172 define a substantially rectangular shaped opening 174 configured to contain at least a portion of second heat exchanger

138. Second heat exchanger 138 may be coupled to one or more of upper member 166, lower member 168, first side member 170, or second side member 172 via one or more brackets or the like.

Figure 4:
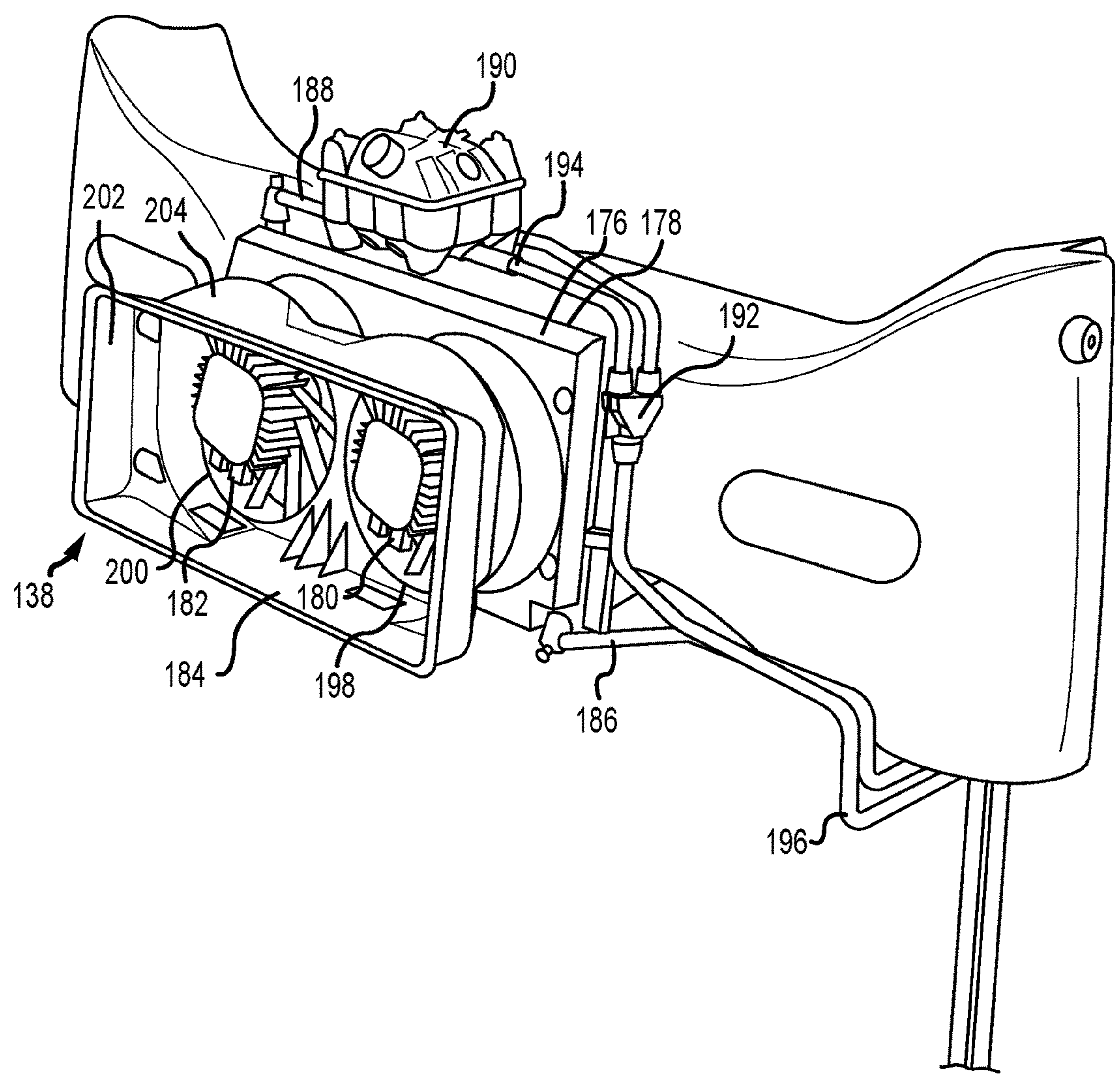
FIG. 4 illustrates a rear perspective view of a heat exchanger assembly and air supply plenum, in accordance with various embodiments.

With additional reference to FIG. 4, second heat exchanger 138 comprises a radiator assembly in various embodiments. More specifically, second heat exchanger 138 comprises a radiator core 176, a fan mounting plate 178, a first fan assembly 180, a second fan assembly 182, and a fan shroud 184. Radiator core 176 is positioned longitudinally forward of and coupled to fan mounting plate 178. Fan mounting plate 178 is positioned longitudinally forward of and coupled to first fan assembly 180 and second fan assembly 182. First fan assembly 180 and second fan assembly 182 are positioned longitudinally forward of and coupled to fan shroud 184. Together, radiator core 176, first fan assembly 180, second fan assembly 182, and fan shroud 184 are configured to dissipate heat from brake resistor 124 to the ambient environment via convective heat transfer. As illustrated in FIG. 4, first fan assembly 180 and second fan assembly 182 each comprise an axial fan assembly configured to pull air longitudinally rearward through radiator core 176; however, first fan assembly 180 and second fan assembly 182 are not limited in this regard and may comprise push fans configured to push air longitudinally rearward through radiator core 176. As such, in various embodiments, first fan assembly 180 and second fan assembly 182 may be positioned longitudinally forward of radiator core 176 rather than positioned longitudinally rearward of radiator core 176.

In various embodiments, one or more coolant lines are configured to deliver coolant to and receive coolant from second heat exchanger 138. More specifically, a coolant inlet line 186 fluidly coupled to brake resistor 124 is further fluidly coupled to a lower corner of radiator core 176 and configured to deliver heated coolant (which may be heated due to heat transfer from brake resistor 124 to the coolant) to radiator core 176. A pump (not shown) may provide the motive force utilized to circulate the coolant to and from brake resistor 124 and radiator core 176. In various embodiments, radiator core 176 comprises a plurality of internal, parallel oriented microchannels configured to increase surface area to permit greater heat transfer as the coolant flows through radiator core 176.

After entering radiator core 176, the heated coolant may flow vertically upward through the plurality of internal, parallel oriented microchannels thereby cooling the heated coolant in the process. First fan assembly 180 and second fan assembly 182 assist in cooling the coolant by increasing convective heat transfer from the coolant to the ambient environment. In various embodiments, second heat exchanger comprises two axial flow fan assemblies (first fan assembly 180 and second fan assembly 182) substantially aligned in the vertical and longitudinal directions but positioned adjacent to each other in the transverse direction; however, second heat exchanger 138 is not limited in this regard and may comprise more or fewer axial fans positioned in any suitable arrangement in various embodiments. First fan assembly 180 and second fan assembly 182 each comprise a plurality of tapered blades extending radially outward from a central rotor rotatably coupled to a stationary stator and a circular shaped blade guard positioned radially outward and extending circumferentially around the plurality of blades.

After passing through radiator core 176, the relatively cooler coolant exits second heat exchanger 138 via an outlet coolant line 188, which is fluidly coupled to a top corner of radiator core 176. In various embodiments, outlet coolant line 188 extends transversely along a width of second heat exchanger 138 and wraps around at least a portion of an expansion tank 190, which may be positioned vertically above upper member 166 and configured to accommodate pressure increases in second thermal management system 136. Outlet coolant line 188 is fluidly coupled to a manifold 192 positioned transversely adjacent to second heat exchanger 138, for example, proximate to the first side 106 of vehicle 100. An expansion tank line 194, which is fluidly coupled to expansion tank 190, is further fluidly coupled to manifold 192. A return line 196, which also is fluidly coupled to manifold 192, is configured to receive the cooled coolant and return the coolant to brake resistor 124 for additional cooling thereof.

As stated above, second heat exchanger 138 further comprises fan shroud 184. In various embodiments, fan shroud 184 may be in fluid communication with first fan assembly 180 and second fan assembly 182. More specifically, fan shroud 184 may comprise a first inlet 198 and a second inlet 200. In various embodiments, first inlet 198 and second inlet 200 may each comprise a circular opening substantially corresponding to the geometry associated with the blade guards of first fan assembly 180 and second fan assembly 182, respectively. In various embodiments, fan shroud 184 may be mechanically coupled to the blade guards of first fan assembly 180 and second fan assembly 182 via one or more fasteners or the like.

Fan shroud 184 further comprises an outlet 202. In various embodiments, outlet 202 comprises a substantially rectangular opening in fluid communication with the ambient environment. In various embodiments, outlet 202 extends through rear panel assembly 140, which may be partially covered by rear vent 142 that may comprise an exhaust grate and one or more transversely extending slats. The exhaust grate comprises a plurality of apertures configured to prevent debris from entering outlet 202, and the one or more transversely extending slats may be oriented at a downward angle to direct airflow downward to reduce and/or prevent adverse aerodynamic effects caused by exhaust air circulating above the top 112 of vehicle 100. A shroud body 204 completely encasing first inlet 198, second inlet 200, and outlet 202 is configured to ensure all (or substantially all) of the air exiting first fan assembly 180 and second fan assembly 182 exits outlet 202 and is directed to the ambient environment.

In various embodiments, a first cooling air pathway CAP1 is configured to allow cooling air to flow to first thermal management system 130 (and first heat exchanger 132), a second cooling air pathway CAP2 is configured to allow cooling air to flow to second thermal management system 136 (and second heat exchanger 138), and a third cooling air pathway CAP3 is configured to allow cooling air to flow to second thermal management system 136 (and second heat exchanger 138). First cooling air pathway CAP1 is defined, in part, by the one or more apertures formed in grille 134. Second cooling air pathway CAP2 and third cooling air pathway CAP3 are defined, in part, by an air supply plenum 300. As vehicle 100 moves during operation, relatively cool air from the ambient environment enters vehicle 100 via first cooling air pathway CAP1, second cooling air pathway CAP2, and third cooling air pathway CAP3, thereby convectively cooling coolant flowing through first thermal management system 130 and second thermal management system 136 (via first heat exchanger 132 and second heat exchanger 138, respectively). Air supply plenum 300 is configured to isolate relatively cool air in the second and third cooling air pathways CAP2, CAP3 from relatively warm air downstream of first cooling air pathway CAP1.

Figure 5A:
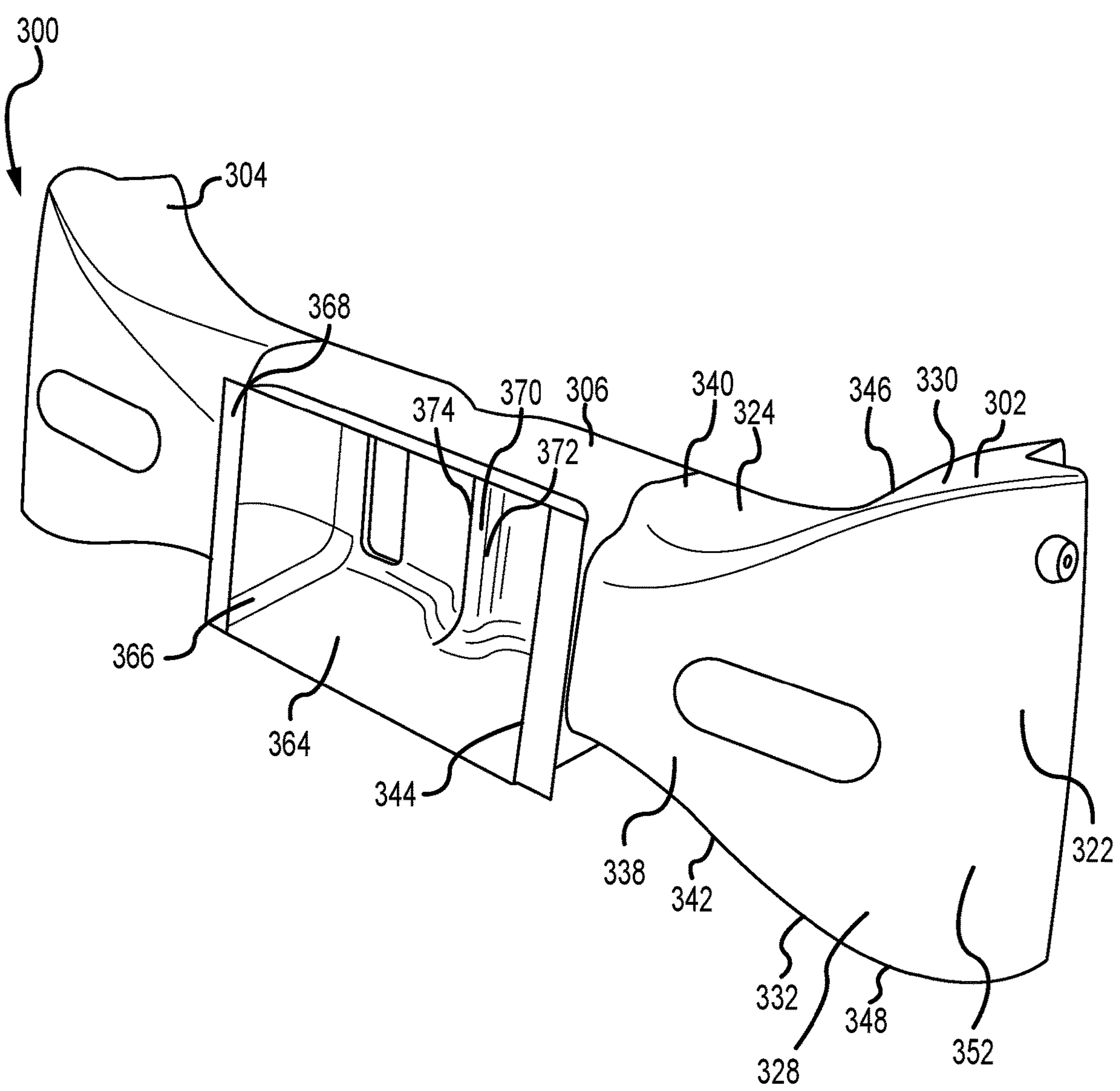
FIGS. 5A and 5B illustrate a rear perspective view and a front perspective view, respectively, of an air supply plenum, in accordance with various embodiments.
Figure 5B:
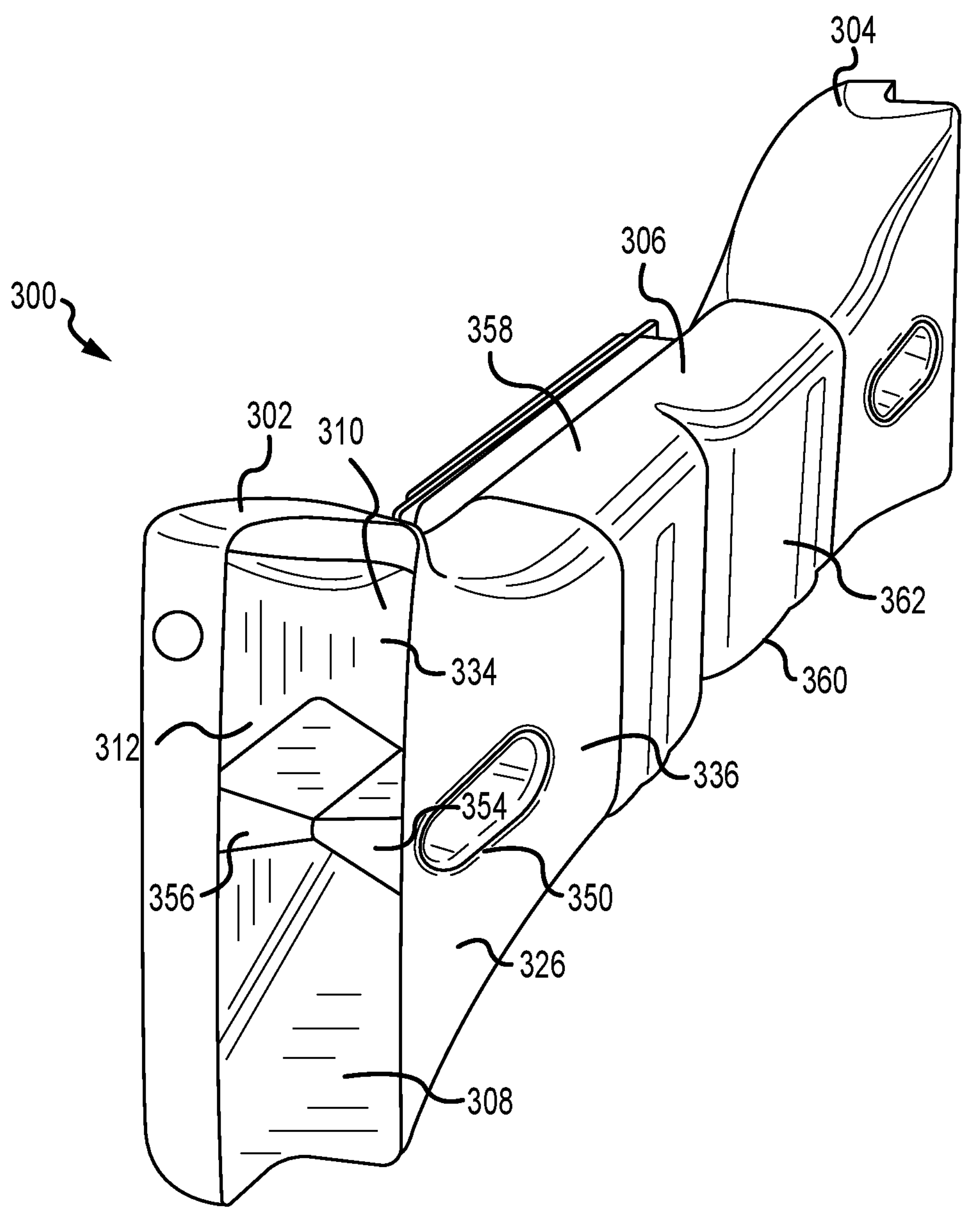

With additional reference to FIGS. 5A and 5B, air supply plenum 300 comprises a first side intake 302, a second side intake 304, and a central duct 306. In various embodiments, air supply plenum 300 is symmetrical about a Z-Y plane extending through a transverse midpoint of vehicle 100. Stated otherwise, second side intake 304 may be substantially similar to first side intake 302 (apart from being mirrored about the Z-Y plane), so the structure associated with second side intake 304 will not be discussed herein for sake of brevity. First side intake 302 and second side intake 304 are in fluid communication with central duct 306 and configured to deliver air from the ambient environment to central duct 306. Central duct 306 is in fluid communication with second heat exchanger 138 and is configured to deliver air from first side intake 302 and second side intake 304 to radiator core 176.

In various embodiments, first side intake 302 is positioned adjacent to the first side 106 of vehicle 100 and second side intake 304 is positioned adjacent to the second side 108 of vehicle 100. In various embodiments, air supply plenum 300 is positioned adjacent to the top 112 of vehicle, for example, adjacent to and vertically below a top surface of backpack fairing assembly 156. First side intake 302 and second side intake 304 are in fluid communication with channel 158. In various embodiments, all (or substantially all) of air supply plenum 300 is positioned vertically above top edges of the driver side and passenger side doors. While described herein as comprising one or more side-fed air intakes, vehicle 100 (and air supply plenum 300) is not limited in this regard and may comprise top-fed or labyrinth-fed air intakes in various embodiments. For example, rather than having two side-fed air intakes, in various embodiments air supply plenum 300 comprises a single, top-fed air intake centered in the transverse direction on the top of vehicle 100 or comprises a single air intake that extends continuously across the top of vehicle 300 to one or both sides 106, 108 of vehicle 100. Numerous embodiments are contemplated in this regard.

First side intake 302 comprises an inlet 308. Inlet 308 may comprise a substantially L-shaped (when viewed along the Y-axis) opening comprising a substantially longitudinally oriented opening 310 continuous with a substantially transversely oriented opening 312. As referred to herein, "substantially longitudinally oriented opening" means an opening or partial opening oriented at +/−0° to 20° relative to the Z-axis (i.e., axis orthogonal to a front surface of vehicle 100) and "substantially transversely oriented opening" means an opening or partial opening oriented at +/−0° to 20° relative to the X-axis (i.e., axis orthogonal to one or both sides of vehicle 100). Stated otherwise, the substantially longitudinally oriented opening 310 of inlet 308 may be substantially flush with the base B of channel 158 and the substantially transversely oriented opening 312 of inlet 308 is substantially flush with a front edge E of backpack fairing assembly 156.

The L-shaped structure of inlet 308 discussed above may be configured to maximize the flow rate of air into first side intake 302 while also conforming with packaging constraints of vehicle 100. More specifically, the structure of inlet 308 may maximize total opening area while occupying roughly half of the area that would otherwise be occupied by an inlet oriented in a single direction (for example, solely in the substantially transverse or longitudinal directions). Inlet 308 comprises a total opening surface area of between approximately 0.050 square meters ($m^2$) and 0.200 $m^2$, between approximately 0.075 $m^2$ and 0.175 $m^2$, or between approximately 0.100 $m^2$ and 0.150 $m^2$. In various embodiments, the combined opening surface area of inlet 308 of first side intake 302 and an inlet of second side intake 304 may be at least 70% of the area of a front surface of radiator heat core 176, at least 75% of the area of the front surface radiator heater core 176, or at least 80% of the area of the front surface of radiator heater core 176.

In various embodiments, the L-shaped structure of inlet 308 (and the inlet of second side intake 304) enables the intake of air from multiple directions, for example, airflow primarily flowing in the transverse direction and airflow primarily flowing in the longitudinal direction. Stated otherwise, inlet 308 is configured to receive airflow not only from the longitudinal direction (for example, from headwinds based on the direction of travel of vehicle 100) but also from the transverse direction (for example, from crosswinds or airflow that is deflected toward substantially longitudinally oriented opening 310 due to low-pressure formations (indicated by arrows designated "L") immediately rearward of rear cabin fairing assembly 154 in channel 158.

First side intake 302 of air supply plenum 300 further comprises an inlet grille 314. Inlet grille 314 comprises a substantially L-shaped structure similar to inlet 308. Inlet grille 314 is in fluid communication with inlet 308. In various embodiments, inlet grille 314 comprises a plurality of substantially (+/−20° relative to Y-axis) vertically oriented slats 316 that help to ensure uniform airflow into first side intake 302. In various embodiments, inlet grille 314 further comprises a mesh material positioned in front of or behind slats 316 configured to prevent debris from entering first side intake 302. In various embodiments, inlet grille 314 comprises a frame 318 configured to interface with one or more alignment features 320 on first side intake 302. In various embodiments, inlet grille 314 may be coupled to first side intake 302 via one or more fittings, fasteners, or the like.

In various embodiments, first side intake 302 comprises an outboard portion 322 and an inboard portion 324. Outboard portion 322 may define inlet 308 and comprise a front wall 326, a rear wall 328, a top wall 330, and a bottom wall 332. Together, front wall 326, rear wall 328, top wall 330, and bottom wall 332 define an outboard flow chamber 334. Similarly, inboard portion 324 comprises a front wall 336, a rear wall 338, a top wall 340, and a bottom wall 342. Together, front wall 336, rear wall 338, top wall 340, and bottom wall 342 of inboard portion 324 define an inboard flow chamber 344. Outboard portion 322 and inboard portion 324 may be fluidly and mechanically coupled together such that outboard flow chamber 334 and inboard flow chamber 344 are in fluid communication to allow air to flow from the ambient environment through outboard flow chamber 334, into inboard flow chamber 344, and into central duct 306.

In various embodiments, top wall 330 of outboard portion 322 and bottom wall 332 of outboard portion 322 are tapered toward top wall 340 and bottom wall 342, respectively, of inboard portion 324. More specifically, top wall 330 of outboard portion 322 comprises a linear or nonlinear decline surface 346 extending between inlet 308 and inboard portion 324 in the transverse direction. Bottom wall 332 of outboard portion 322 comprises a linear or nonlinear incline surface 348 extending between inlet 308 and inboard portion 324 in the transverse direction. Stated otherwise, a height of outboard portion 322 is greater than a height of inboard portion 324 and the height of outboard portion 322 continuously decreases as outboard portion 322 approaches inboard portion 324. In various embodiments, the longitudinal distance between front wall 326 and rear wall 328 are substantially constant between outboard portion 322 and inboard portion 324.

The vertical and longitudinal dimensions of outboard portion 322 and inboard portion 324 outlined above result in a cross-sectional chamber area that continuously decreases from inlet 308 to inboard portion 324. Because fluid velocity is inversely proportionate to cross-sectional area, the structures outlined above may result in an increased air velocity as air flows through outboard portion 322 and into inboard portion 324. The increased air velocity may, in turn, lead to greater cooling capacity by second heat exchanger 138.

First side intake 302 further comprises one or more curved features. More specifically, in various embodiments, front wall 326 of outboard portion 322 comprises a concave surface 350 and rear wall 328 of outboard portion 322 comprises a convex surface 352. Concave surface 350 is adjacent to inlet 308 on front wall 326 and convex surface 352 is adjacent to inlet 308 on rear wall 328. As air enters inlet 308 from the longitudinal direction, convex surface 352 may redirect the air to the transverse direction (toward central duct 306). Convex surface 352 and concave surface 350 may be configured to reduce losses caused by airflow separation by creating a smooth transition for incoming air.

In various embodiments, first side intake 302 further comprises one or more structural support features. First side intake 302 comprises a front support pillar 354 and a rear support pillar 356. Front support pillar 354 may be integral with front wall 326 and may extend longitudinally rearward from front wall 326 into outboard flow chamber 334 and inboard flow chamber 344, thereby forming a recess in front wall 326. Rear support pillar 356 may be integral with rear wall 328 and may extend longitudinally forward from rear wall 328 into outboard flow chamber 334 and inboard flow chamber 344, thereby forming a recess in rear wall 328. In various embodiments, each of front support pillar 354 and rear support pillar 356 comprise a discorectangular base formed in front wall 326 and rear wall 328, respectively. Front support pillar 354 and rear support pillar 356 converge (in the transverse, longitudinal, and vertical directions) from front wall 326 and rear wall 328, respectively, and may be coupled together at their distal portions. Front support pillar 354 and rear support pillar 356 are configured to resist compressive and tensile forces in the longitudinal direction resulting from minor longitudinal (or cantilever) movements of the backpack hydrogen storage structure as vehicle 100 operates. Front support pillar 354 and rear support pillar 356 may further act as flow-straightening vanes, thereby straightening the flow of air through outboard flow chamber 334 and inboard flow chamber 344.

As discussed above, air supply plenum 300 further comprises central duct 306 in various embodiments. Central duct 306 comprises a top wall 358, a bottom wall 360, and a front wall 362, which define a central flow chamber 364. Central duct 306 is in fluid communication with and configured to receive airflow from first side intake 302 and second side intake 304 in primarily the transverse direction. As such, central duct 306 comprises a first inlet in fluid communication with inboard flow chamber 344 of first side intake 302 and a second inlet in fluid communication with an inboard flow chamber of second side intake 304.

Central duct 306 further comprises an outlet 366 configured to deliver air to second heat exchanger 138 primarily in the longitudinal direction. Outlet 366 comprises a substantially rectangular shaped opening formed through a rear portion of central duct 306 and may comprise an opening surface area substantially (for example, at least 80%, at least 90% or at least 95%) similar to the surface area of radiator core 176. In various embodiment, outlet 366 is defined by a mounting frame 368 that provides a flat surface for mounting second heat exchanger 138 to air supply plenum 300.

In various embodiments, central duct 306 further comprises a flow guide 370 formed in front wall 362 of central duct 306. Flow guide 370 may be configured to redirect air flowing primarily in the transverse direction to the longitudinal direction. In various embodiments, flow guide 370 comprises a triangular prism-shaped recess formed in front wall 362 of central duct 306. The triangular prism-shaped recess forms a first flow surface 372 and second flow surface 374 in central flow chamber 364. First flow surface 372 and second flow surface 374 may be configured to redirect air flow from first side intake 302 and second side intake 304, respectively, to second heat exchanger 138. Without flow guide 370, air streams travelling through air supply plenum 300 (through first side intake 302 and second side intake 304, respectively) may collide and create a stagnation region that can result in a reduction of flow uniformity (which may in turn adversely affect cooling capacity of second heat exchanger 138). Overall, air supply plenum 300 may be configured to deliver air to second heat exchanger 138 with a flow uniformity of at least 80%, at least 85%, or at least 90%.

Returning momentarily to FIGS. 3A-3C, air supply plenum 300 is coupled to vessel frame assembly 146 in various embodiments. More specifically, air supply plenum 300 is coupled to upper frame assembly 164 via a first fixation strut 206, a second fixation strut 208, a first bracket 210, and a second bracket 212. First fixation strut 206 is coupled to upper member 166 (near an intersection of upper member 166 and first side member 170) on a first end and coupled to rear wall 328 of first side intake 302 on a second end. Similarly, second fixation strut 208 is coupled to upper member 166 (near an intersection of upper member 166 and second side member 172) on a first end and coupled to a rear wall of second side intake 304 on a second end. First bracket 210 is coupled to front wall 362 of central duct 306 on a first end and coupled to a forward member 214 of upper frame assembly 164 on a second end. Similarly, second bracket 212 is coupled to front wall 326 of central duct 306 on a first end and coupled to forward member 214 of upper frame assembly 164 on a second end. First bracket 210 and second bracket 212 may be spaced apart in the transverse direction.

Air supply plenum 300 (including first side intake 302, second side intake 304, and central duct 306) may comprise any material having a relatively low weight and relatively low coefficient of thermal conductivity. More specifically, in various embodiments, air supply plenum 300 comprises a polymer or composite material such as acrylonitrile butadiene styrene (ABS), polyvinyl chloride (PVC), polystyrene, polycarbonate, polysulfone, polyimide, polypropylene, polyethylene, carbon fiber, or other suitable material. The material of air supply plenum 300 may be configured with a coefficient of thermal conductivity of less than 0.4 watts per meter-Kelvin (W/mK), less than 0.3 W/mK, or less than 0.2 W/mK. In various embodiments, the material associated with air supply plenum 300 may further comprise one or more additives configured to increase the thermal insulative properties of the material, for example, glass fiber, carbon fiber, fluorocarbon, or graphite additives. Air supply plenum 300 may be formed using any suitable manufacturing technique, for example, rotational molding, injection molding, blow molding, compression molding, extrusion molding, thermoforming, additive manufacturing, or a combination thereof.

Air supply plenum 300, as discussed herein, may be configured to fluidly and thermally isolate air in second cooling air pathway CAP2 and third cooling air pathway CAP3 from heated air originating in cabin 114. More specifically, as vehicle 100 operates, air in cabin 114 may become heated due to convective and radiative heat transfer from fuel cell system 128 or other heat generating components. This air may exit cabin 114 and flow rearward toward backpack storage compartment 144. In most situations, this air is relatively warmer than the air in the ambient environment despite exchange taking place in first heat exchanger 132. Without isolation, the heated air may travel rearward through, under, and/or around cabin 114, enter backpack storage compartment 144, and enter second heat exchanger 138, thereby adversely impacting the cooling capacity of second heat exchanger 138. As a result, air supply plenum 300 and/or labyrinth seal 162 may be configured to ensure cool air from the ambient environment is introduced to second heat exchanger 138 with minimal heat transfer taking place between the air in and around cabin 114 (such as in backpack storage compartment 144) and the air being delivered to second heat exchanger 138 through second cooling air pathway CAP2 and third cooling air pathway CAP3.

In various embodiments, air supply plenum 300 and/or vehicle 100 may be further equipped with one or more structures configured to further limit heat transfer to air flowing through second cooling air pathway CAP2 and third cooling air pathway CAP3. More specifically, vehicle 100 may comprise a heat shield configured to completely or partially isolate air supply plenum 300 from relatively warm air circulating within and around cabin 114 and/or backpack storage compartment. In various embodiments, vehicle 100 comprises a substantially horizontally oriented heat shield positioned adjacent to and vertically below air supply plenum 300. The heat shield may extend transversely along an entire width of vehicle 100 such that the heat shield terminates adjacent to first side 106 and second side 108 in the transverse direction. The heat shield may further extend longitudinally between rear panel assembly 140 and a rear surface 216 of cabin 114. While described herein as comprising a substantially horizontally oriented heat shield positioned below air supply plenum 300, it should be appreciated that the heat shield may be oriented in any suitable manner with respect to air supply plenum 300. For example, the heat shield may be positioned substantially vertically and position forward of air supply plenum 300 or may encapsulate air supply plenum 300 in various embodiments. Moreover, air supply plenum 300 may comprise an interior and/or exterior insulative lining in addition to, or in place of, the heat shield in various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric vehicle, comprising:

a first heat exchanger positioned adjacent to a front of the electric vehicle and configured to transfer heat generated from a first heat generating system to an ambient environment;

a second heat exchanger positioned adjacent to a rear of the electric vehicle and configured to transfer heat generated from a second heat generating system to the ambient environment; and an air supply plenum positioned longitudinally between the first heat exchanger and the second heat exchanger and in fluid communication with the ambient environment, wherein the air supply plenum defines a cooling air pathway extending between the ambient environment and the second heat exchanger, and wherein the air supply plenum isolates air flowing through the cooling air pathway from air circulating within the electric vehicle.

2. The electric vehicle of claim 1, wherein the first heat generating system comprises a fuel cell system.

3. The electric vehicle of claim 2, wherein the second heat generating system comprises a brake resistor.

4. The electric vehicle of claim 1, wherein the air supply plenum comprises a first side intake in fluid communication with the ambient environment on a first side of the electric vehicle and a second side intake in fluid communication with the ambient environment on a second side of the electric vehicle.

5. The electric vehicle of claim 1, wherein the air supply plenum is positioned in a backpack storage compartment of the electric vehicle.

6. The electric vehicle of claim 5, wherein the air supply plenum is positioned vertically above at least one horizontally oriented fuel storage vessel.

7. The electric vehicle of claim 4, wherein the first side intake comprises an inlet comprising a substantially transversely oriented opening and a substantially longitudinally oriented opening.

8. The electric vehicle of claim 7, wherein the inlet is positioned adjacent to a channel positioned between a rear cabin fairing assembly and a backpack fairing assembly.

9. An electric vehicle, comprising:

a vehicle body comprising a first side, a second side, a front, and a rear;

a first heat exchanger positioned adjacent to the front of the vehicle body;

a second heat exchanger positioned adjacent to the rear of the vehicle body; and an air supply plenum in fluid communication with an ambient environment located on at least one of the first side or the second side, wherein the air supply plenum is in fluid communication with the second heat exchanger and configured to isolate air flowing from the ambient environment to the second heat exchanger from air circulating within the vehicle body.

10. The electric vehicle of claim 9, wherein the first heat exchanger comprises a fuel cell radiator and the second heat exchanger comprises a brake resistor radiator.

11. The electric vehicle of claim 9, further comprising a rear cabin fairing assembly extending rearward from a cabin of the electric vehicle.

12. The electric vehicle of claim 11, further comprising a backpack fairing assembly positioned adjacent to and rearward of the rear cabin fairing assembly.

13. The electric vehicle of claim 12, further comprising a channel positioned between the rear cabin fairing assembly and the backpack fairing assembly.

14. The electric vehicle of claim 13, further comprising a labyrinth seal positioned between the rear cabin fairing assembly and the backpack fairing assembly.

15. The electric vehicle of claim 14, wherein the air supply plenum comprises at least one inlet in fluid communication with the channel.

16. The electric vehicle of claim 9, wherein the air supply plenum comprises an outboard portion and an inboard portion.

17. The electric vehicle of claim 16, wherein a height of at least a portion of the outboard portion is greater than a height of the inboard portion.

18. An electric vehicle, comprising:

a heat exchanger positioned adjacent to a rear of the electric vehicle and in fluid communication with an ambient environment; and an air supply plenum positioned forward of the heat exchanger and in fluid communication with the heat exchanger, wherein the air supply plenum comprises a first side intake in fluid communication with the ambient environment located on a first side of the electric vehicle, wherein the air supply plenum comprises a second side intake in fluid communication with the ambient environment located on a second side of the electric vehicle, and wherein the air supply plenum comprises a central duct in fluid communication with the first side intake, the second side intake, and the heat exchanger.

19. The electric vehicle of claim 18, wherein the central duct is coupled to the heat exchanger.

20. The electric vehicle of claim 18, wherein the air supply plenum isolates air flowing from the ambient environment to the heat exchanger from air circulating within the electric vehicle.

* * * * *